United States Patent
Tsuchiya et al.

(10) Patent No.: US 10,286,302 B2
(45) Date of Patent: *May 14, 2019

(54) SHOOTING GAME CONTROL METHOD AND GAME SYSTEM

(71) Applicant: GREE, Inc., Tokyo (JP)

(72) Inventors: Yuichi Tsuchiya, Tokyo (JP); Norihiro Sawada, Tokyo (JP); Tadashi Nagano, Tokyo (JP); Takeshi Arakawa, Mitaka (JP)

(73) Assignee: GREE, Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/711,131

(22) Filed: Sep. 21, 2017

(65) Prior Publication Data

US 2018/0008889 A1  Jan. 11, 2018

Related U.S. Application Data

(63) Continuation of application No. 15/376,810, filed on Dec. 13, 2016, now Pat. No. 9,795,873, which is a (Continued)

(30) Foreign Application Priority Data

Feb. 26, 2013 (JP) ................................ 2013-035555
Jun. 24, 2013 (JP) ................................ 2013-131778

(51) Int. Cl.
*A63F 13/00* (2014.01)
*A63F 13/2145* (2014.01)
(Continued)

(52) U.S. Cl.
CPC ........ *A63F 13/2145* (2014.09); *A63F 13/426* (2014.09); *A63F 13/837* (2014.09)

(58) Field of Classification Search
CPC .............................. A63F 13/837; A63F 13/50
(Continued)

(56) References Cited

U.S. PATENT DOCUMENTS 7,140,962 B2  11/2006  Okuda
9,149,720 B2  10/2015  Sakurai
(Continued)

FOREIGN PATENT DOCUMENTS

JP  2010-17395  1/2010

OTHER PUBLICATIONS

Tampatec, "Top Andriod Game Apps on Nexus Tablet Review", published Oct. 24, 2012.*

*Primary Examiner* — Michael A Cuff
(74) *Attorney, Agent, or Firm* — Oblon, McClelland, Maier & Neustadt, L.L.P.

(57) ABSTRACT

According to one embodiment, a shooting game control method, which is executed by a computer incorporated in a device including a display and a touch panel, includes accepting a touch operation on the touch panel; displaying a first frame indicative of a shooting effective range on the display in accordance with a position of the touch operation; accepting an instruction for an attack on an attack target in a state in which the first frame is displayed; determining whether the attack target in a game image displayed on the display is within the first frame or not, at a time point when the instruction for the attack has been accepted; and controlling the attack on the attack target in the game image in accordance with a result of the determining.

17 Claims, 4 Drawing Sheets

Related U.S. Application Data continuation of application No. 14/186,496, filed on Feb. 21, 2014, now Pat. No. 9,561,436.

(51) Int. Cl.
  *A63F 13/837* (2014.01)
  *A63F 13/426* (2014.01)
(58) Field of Classification Search
  USPC .............................................................. 463/2
  See application file for complete search history.

(56) References Cited

U.S. PATENT DOCUMENTS

| | | |
|---|---|---|
| 2004/0110560 A1 | 6/2004 | Aonuma |
| 2007/0024597 A1 | 2/2007 | Matsuoka |
| 2007/0129990 A1 | 6/2007 | Tzruya |
| 2008/0309916 A1 | 12/2008 | Mok |
| 2009/0247250 A1 | 10/2009 | Kato |
| 2011/0039618 A1 | 2/2011 | Ichiyanagi |
| 2014/0364180 A1 | 12/2014 | Olivar |
| 2015/0362288 A1 | 12/2015 | Sammut |

* cited by examiner

SHOOTING GAME CONTROL METHOD AND GAME SYSTEM

CROSS-REFERENCE TO RELATED APPLICATIONS

This application is a continuation application which claims the benefit of priority under 35 U.S.C. § 120 of U.S. application Ser. No. 15/376,810, filed Dec. 13, 2016, which is a continuation of U.S. application Ser. No. 14/186,496, filed Feb. 21, 2014, (now U.S. Pat. No. 9,561,436), which is based upon and claims the benefit of priority from Japanese Patent Applications No. 2013-035555, filed on Feb. 26, 2013 and No. 2013-131778, filed on Jun. 24, 2013, the entire contents of which are incorporated herein by reference.

BACKGROUND OF THE INVENTION

1. Field of the Invention

The present invention relates to a shooting game control method and a game system, which are suited to a device including a touch-panel-type display screen such as a smartphone.

2. Description of the Related Art

Conventionally, there has been thought a technique wherein, in order to realize a game with high operability with use of a touch panel, if a touch panel is slid-operated so as to draw a locus surrounding an enemy character on a display screen, the enemy character surrounded by the locus is automatically registered as a lock-on target, and a shooting action aiming at the enemy character of the lock-on target is executed in accordance with a subsequent tap operation (for example, Patent document 1).

CITATION LIST

Patent Literature

Patent document 1: Jpn. Pat. Appln. KOKAI Publication No. 2010-017395

BRIEF SUMMARY OF THE INVENTION

In the technique disclosed in Patent document 1, in order to pinpoint an enemy character, an operation of "drawing a locus surrounding an enemy character" is executed. This operation realizes an easy-to-understand operability which is unique to the game using the touch panel, but this operation is unnatural in a game simulating a real shooting.

Specifically, in a game simulating a real shooting, for example, in a game simulating a long-distance shooting, for example, it appears more natural to adopt such an operation system that a button operation or the like, which corresponds to a trigger of a sniper's rifle, is executed in a state in which an enemy character has been captured at the center of the view field of the scope of the sniper's rifle by using the scope of the sniper's rifle, and hereby a bullet hits the enemy character.

In the case where this kind of game with operability simulating a real shooting is realized by a device with a limited display area, such as a smartphone, a concrete operation may become such that, for example, an enemy character is found out from the screen, the image of the enemy character is enlarged, an arbitrary shooting point is specified, and shootings actually executed. Specifically, in some cases, a game, which is realized by a device with a limited display area, tends to make an overall operation complex, and a speedy game development may be hindered.

On the other hand, there are many shooting games with an auto-aiming function of instantaneously and automatically aiming at a nearby enemy character by performing a predetermined key operation. In particular, in a game in which many enemy characters appear and the numbers of successive shootings of enemy characters are contested the auto-aiming function is effective, but it is difficult to express a weighting or the like of scores based on a difference in shooting position.

The object of the present invention is to provide a shooting game control method and a game system, which can achieve both precise shooting and speedy game development by a simple and easy-to-understand operation.

In general, according to one embodiment, a shooting game control method, which is executed by a computer incorporated in a device including a display configured to display a game image and a touch panel module provided integral with the display, includes accepting a touch operation on the touch panel module; displaying a first frame indicative of a shooting effective range on the display in accordance with a position of the touch operation; accepting an instruction for an attack on an attack target in a state in which the first frame is displayed; determining whether the attack target in a game image displayed or the display is within the first frame or not, at a time point when the operation for the attack has been accepted; and controlling the attack on the attack target in the game image in accordance with a result of the determining.

According to the present invention, it is possible to achieve both precise shooting and speedy game development by a simple and easy-to-understand operation.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment in a case where the invention is applied to a shooting game program, which is executed by a smartphone, will now be described with reference to the accompanying drawings.

Figure 1:
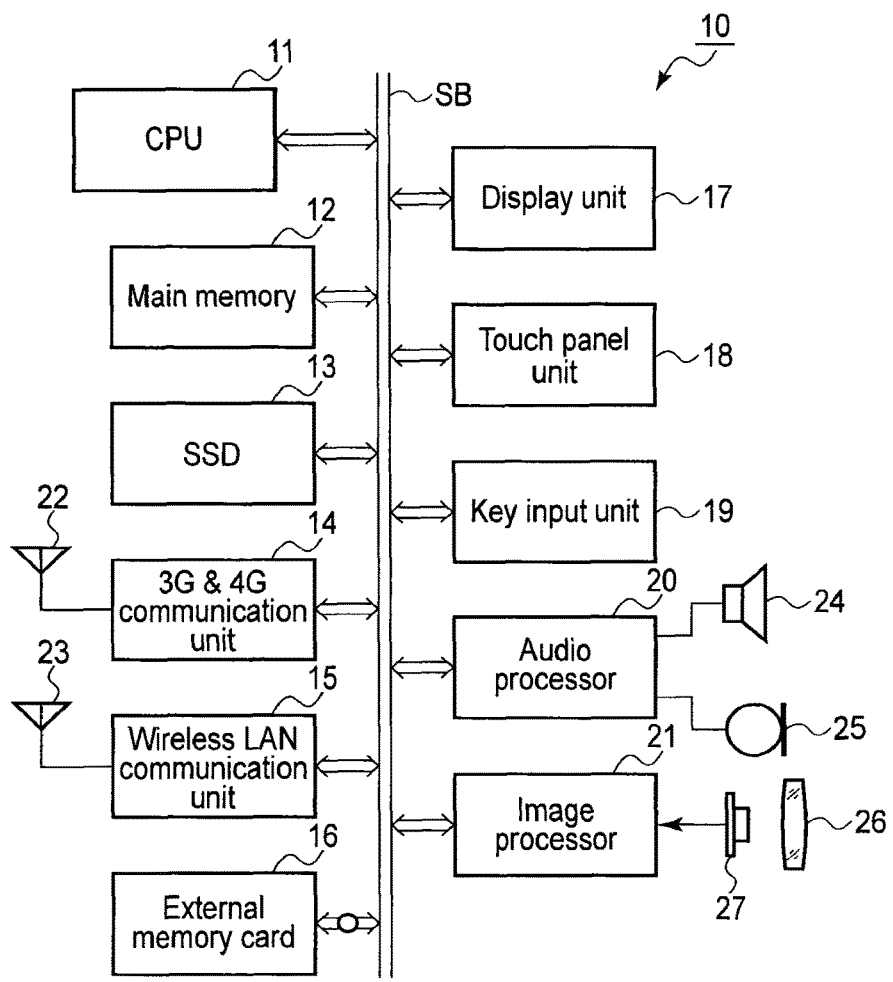
FIG. 1 is a block diagram illustrating a functional configuration of electric circuits of a smartphone according to an embodiment of the invention.

FIG. 1 is a block diagram illustrating a functional configuration of electronic circuits of a smartphone 10 according to the embodiment. In FIG. 1, a CPU 11 executes a control operation of the entirety of the smartphone 10. A main memory 12, a solid-state drive (SSD) 13, a 3G & 4G communication unit 14, a wireless LAN communication unit 15, an external memory card 16, a display unit 17, a touch panel unit 18, a key input unit 19, an audio processor 20, and an image processor 21 are connected to the CPU 11 via a system bus SB.

The CPU 11 reads out programs (an operating system (OS) and an application program running on the OS) stored in the solid-state drive 13 and fixed pattern data, develops and loads them in the main memory 12, and executes the programs, thereby comprehensively controlling the entire operation of the smartphone 10.

The main memory 12 is composed of, for example, an SRAM, and functions as a work memory of the CPU 11. The solid-state drive 13 is composed of a nonvolatile memory, for instance, a flash memory, and stores, as a storage medium of the smartphone 10, various content data such as image data and song data, as well as the above-described operation programs and various fixed pattern data.

The 3G & 4G communication unit 14 is a communication unit which operates in a dual mode, and transmits/receives data to/from a nearby base station (not shown) via an antenna 22, based on a third-generation mobile communication system according to the IMT-2000 standard, and a fourth-generation mobile communication system according to the IMT-Advance standard.

The wireless LAN communication unit 15 transmits/receives data to/from a nearby access point (not shown) or the like via an antenna 23, based on, for example, the IEEE802.11a/b/g/n standard.

The display unit 17 is composed of a backlight-equipped TFT color liquid crystal panel, and a driving unit thereof. The display unit 17 displays various images.

The touch panel unit 18 is configured to be integral with the display unit 17 by using a transparent electrode. The touch panel unit 18 generates and outputs two-dimensional position coordinate information which corresponds to a touch operation by the user.

The key input unit 19 is composed of some key switches including a power key and a shutter key of a camera function, which are provided on the casing of the smartphone 10, and a driving circuit of these key switches.

The audio processor 20 converts digital audio data, which is delivered via the system bus SB, to an analog audio signal, and outputs the analog audio signal from a speaker 24. In addition, the audio processor 20 samples an analog audio signal, which is input from a microphone 25, converts the analog audio signal to digital data and outputs the digital data.

The image processor 21 converts to digital data an image signal which is output from a solid-state imaging device 27 in accordance with an optical image which is focused on an imaging surface of the solid-state imaging device 27 via an optical lens system 26. The solid-state imaging device 27 is composed of, for example, a CCD (Charge Coupled Device). The image processor 21 creates and outputs file data which is compressed in data amount by a preset file format, for example, by JPEG (Joint Photographic Experts Group) in the case of a still image.

Next, an operation in the embodiment is described.

The operation to be described below is executed after the CPU 11 has read out an application program for a shooting game that is stored in the solid-state drive 13, as described above, and has developed and loaded the application program in the main memory 12. The application program stored in the solid-state drive 13 is not limited to a program which was stored in the solid-state drive 13 at a time of factory shipment of the smartphone 10, and may be a program which is downloaded from the outside by the user of the smartphone 10 via the antenna 22 and 3G & 4G communication unit 14, or the antenna 23 and wireless LAN communication unit 15.

Figure 2:
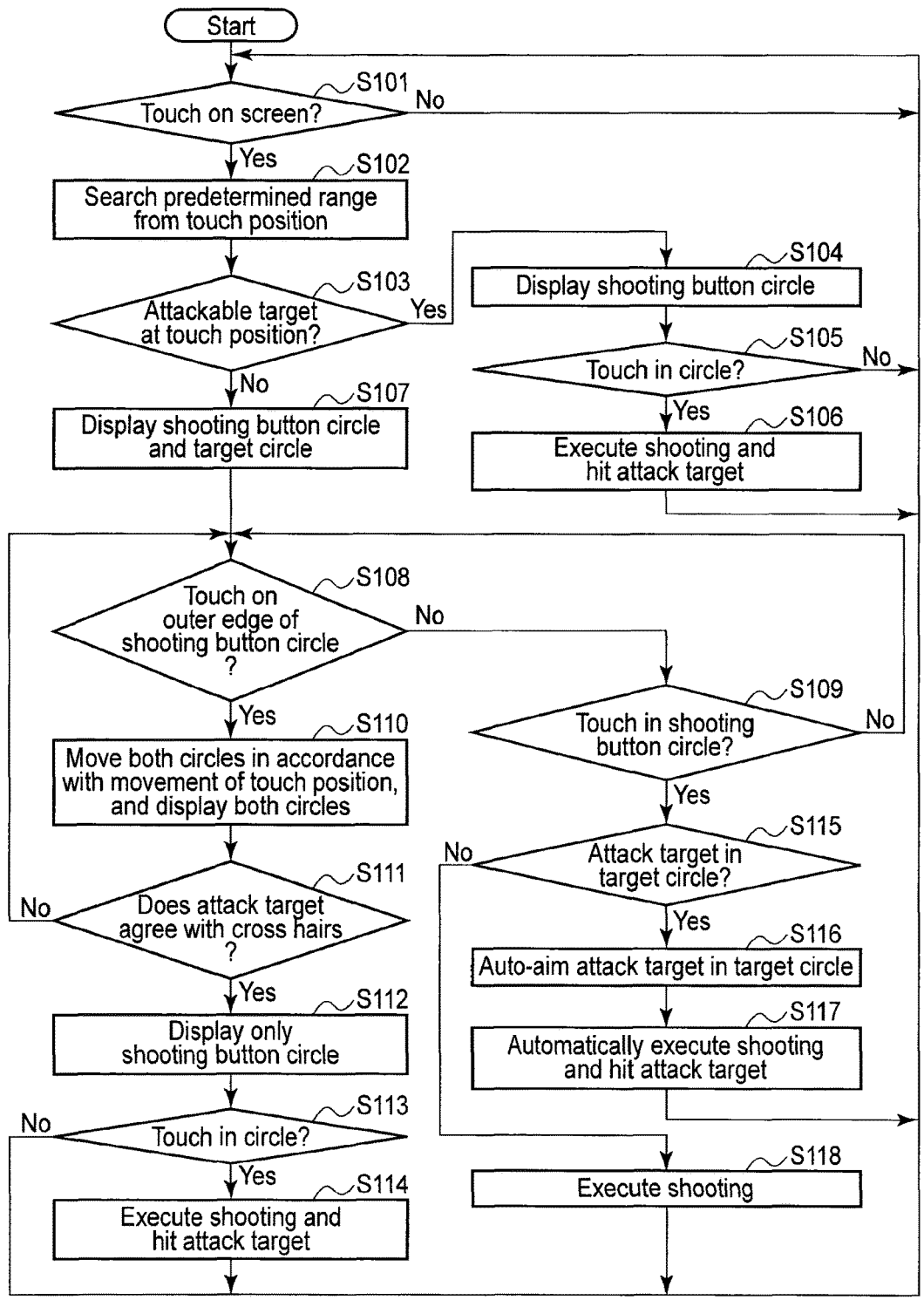
FIG. 2 is a flowchart illustrating the content of a process in association with a touch operation during a shooting game in the embodiment.

FIG. 2 is a view which extracts and illustrates the content of a process of a shooting action in association with a touch operation on the touch panel unit 18, the process being executed by the CPU 11 in the shooting game with the progress of the game.

At the beginning of the process, the CPU 11 repeatedly determines whether a touch operation by a user has been executed on the touch panel unit 18, thus standing by for a touch operation (step S101).

When a touch operation has been executed, the CPU 11, which has determined this touch operation in step S101, acquires coordinates of the touch-operated position from the touch panel unit 18, searches a predetermined range centering at the touch-operated position in the game image which is being displayed on the display unit 17 at that time. To be more specific, the CPU 11 searches a range which is within a target circle TC (to be described later) and is covered by an auto-aiming function, and searches for an attack target in the course of progress of the game (step S102).

Based on the search result, the CPU 11 determines whether the attack target exists at the touch-operated position and the attack target has been directly designated by the touch operation (step S103).

If it is determined that the attack target exists at the touch-operated position and the attack target has been directly designated by the touch operation, the CPU 11 causes the display unit 17 to display a shooting button circle SC centering at the touch-operated position (step S104).

Figure 3:
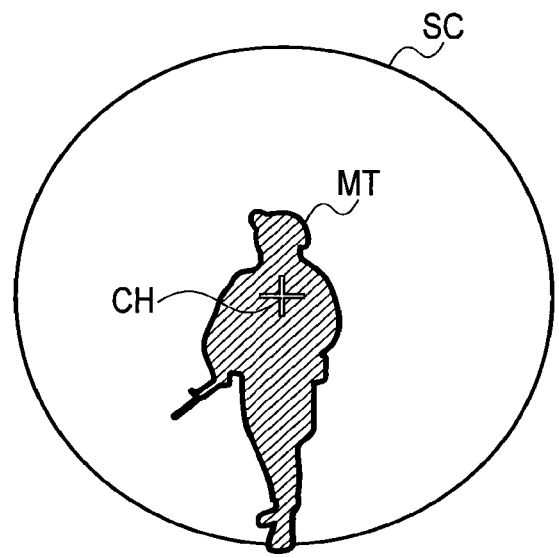
FIG. 3 is a view illustrating an image of a part of a shooting button circle which is displayed during the game in the embodiment.

FIG. 3 is a view illustrating an image of the part of the shooting button circle SC which is displayed on the display unit 17 at this time. As illustrated in FIG. 3, the shooting button circle SC simulates an image of an optical sight (scope) centering at cross hair CH having a cross shape, which is disposed at the touch position. FIG. 3 shows the state in which the central cross hair CH is displayed such that the cross hair CH overlaps a substantially central part of the chest region of an attack target MT.

In this shooting game, it is assumed that the outer frame of the shooting button circle SC functions as an operation element which instructs movement of a shooting position by a slide operation by the user, and the inner part of the shooting button circle SC functions as button for instructing shooting.

While executing the above-described display the CPU 11 determines, based on an input from the touch panel unit 18, whether a touch operation has been executed in the shooting button circle SC within a predetermined time period, for example, within two seconds (step S105).

If it is determined that a touch operation has been executed in the shooting button circle SC, the CPU 11 executes shooting at the attack target MT with the progress of the game, and executes a process for an expression by video and audio, and a process for a score, deeming that a bullet hit the attack target MT (step S106). Thereafter, the CPU 11 returns to the process from step S101, in preparation for a touch operation on the next attack target.

In step S105, if no touch operation has been executed in the shooting button circle SC within the predetermined time period, for example, within two seconds, the CPU 11 release the display of the shooting button circle SC and the cross hair CH shown in FIG. 3, and returns to the process from step S101, in preparation for a touch operation on the next attack target.

In step S103, if it is determined that the attack target does not exist at the position which has been touch-operated by the user and that the attack target has not been directly designated by the touch operation, the CPU 11 causes the touch panel unit 18 to display a shooting button circle SC and a target circle TC which concentrically center at the touch-operated position (step S107).

Figure 4:
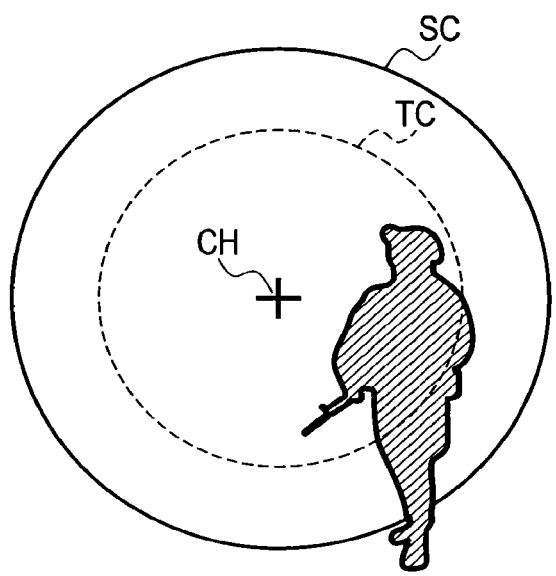
FIG. 4 is a view illustrating an image of a part of a shooting button circle which is displayed during the game in the embodiment.

FIG. 4 is a view illustrating an image of the part of the shooting button circle SC which is displayed on the display unit 17 at this time. As illustrated in FIG. 4, the shooting button circle SC simulates an image of the view field of an optical sight (scope) centering at cross hair CH having a cross shape, which is disposed at the touch position. The concentric target circle TC is displayed inside the shooting button circle SC, for example, by a red broken line (a black broken line in FIG. 4). The target circle TC is representative of a range in which a bullet can hit an attack target by executing shooting by an auto-aiming function.

FIG. 4 illustrates a state in which the attack target MT deviates from the cross hair CH, but a major part of the upper body is within the target circle TC and it is highly possible that shooting is successfully executed by the auto-aiming function and a bullet hits the attack target MT.

The CPU 11 determines, based on an input from the touch panel unit 18, whether an outer edge of the shooting button circle SC has been touch-operated in the state in which the shooting button circle SC, together with the target circle TC, is displayed on the display unit 17 (step S108).

If it is determined that the outer edge of the shooting button circle SC has not been touch-operated, the CPU 11 further determines, based on an input from the touch panel unit 18, whether an inside of the shooting button circle SC has been touch-operated (step S109).

If it is determined that the inside of the shooting button circle SC has not been touch-operated, either, the CPU 11 returns to the process from step S108.

In this manner, by repeatedly executing the process of steps S108 and S109, the CPU 11 stands by for a touch operation on the outer edge or the inside of the shooting button circle SC, while keeping the display state on the display unit 17 as shown in FIG. 4.

In the case where the outer edge of the shooting button circle SC has been touch-operated, if this operation is determined in step S108, the CPU 11 accepts a subsequent slide operation of moving the touch operation while the touch state on the touch panel unit 18 is being kept. Based on the accepted content, the CPU 11 moves the display position of the shooting button circle SC and target circle TC (step S110).

Then, in accordance with this movement, the CPU 11 determines whether the attack target exists at the position of the newly moved cross hair CH and the attack target can directly be shot (step S111).

If it is determined that the attack target does not exist at the position of the moved cross hair CH and the attack target cannot directly be shot, the CPU 11 returns to the process from step S108.

In step S111, if it is determined that the attack target exists at the position of the moved cross hair CH and the attack target can directly be shot, the CPU 11 turns off the display of the target circle TC on the touch panel unit 18, and effects such a display state, as shown in FIG. 3, in which only the shooting button circle SC and cross hair CH are displayed in association with the attack target MT (step S112).

Then, the CPU 11 determines, based on an input from the touch panel unit 18, whether a touch operation has been executed in the shooting button circle SC within a predetermined time period, for example, within two seconds (step S113).

If it is determined that a touch operation has been executed in the shooting button circle SC, the CPU 11 executes shooting at the attack target MT with the progress of the game, and executes a process for an expression by video and audio, and a process for a score, deeming that a bullet hit the attack target MT (step S114). Thereafter, the CPU 11 returns to the process from step S101, in preparation for a touch operation on the next attack target.

In step S113, if no touch operation has been executed in the shooting button circle SC within the predetermined time period, for example, within two seconds, the CPU 11 release the display of the shooting button circle SC and cross hair CH, and returns to the process from step S101, in preparation for a touch operation on the next attack target.

In the case where a touch operation has been executed in the shooting button circle SC in the state in which the shooting button circle SC and target circle TC are being displayed on the display unit 17, as shown in FIG. 4, if the CPU 11 determines this operation in step S109, the CPU 11 determines whether the attack target MT exists in the target circle TC at this time (step S115).

If it is determined that the attack target MT exists in the target circle TC, the CPU 11 auto-aims at the attack target MT existing in the target circle TC, and causes the position of the cross hair CH to be displayed on the display unit 17 in accordance with the position of the attack target MT (step S116). If there is a plurality of attack targets in the target circle TC, the CPU 11 auto-aims at the attack target MT existing close to the cross hair CH.

Figure 5:
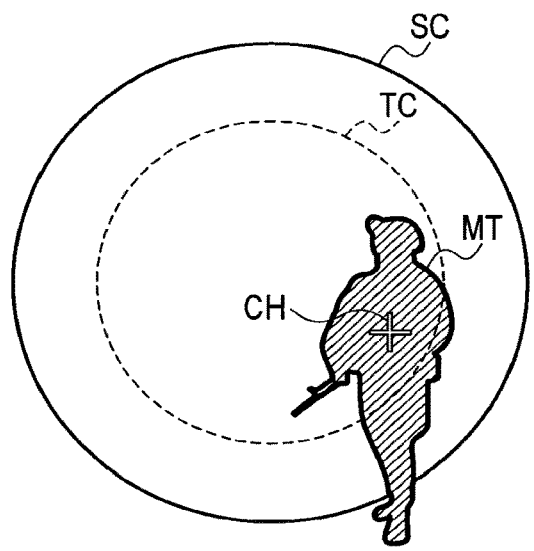
FIG. 5 is a view illustrating an image of a part of a shooting button circle which is displayed during the game in the embodiment.

FIG. 5 is a view illustrating an image of the part of the shooting button circle SC which is displayed on the display unit 17 at this time. FIG. 5 shows a state in which the cross hair CH are moved away from the center of the target circle TC by the auto-aiming function, so as to locate the position of the attack target MT existing in the shooting button circle SC.

In this manner, at the same time as the cross hair CH is moved to the attack target MT by the auto-aiming function and is displayed, the CPU 11 automatically executes shooting at the attack target MT, and executes a process for an expression by video and audio, and a process for a score, deeming that a bullet hit the attack target MT (step S117). Thereafter, the CPU 11 returns to the process from step S101, in preparation for a touch operation on the next attack target.

If it is determined in step S115 that the attack target MT does not exist in the target circle TC, there is no attack target, despite shooting having been instructed by the user's touch operation, and the auto-aiming function cannot be executed. Thus, the CPU 11 executes shooting, without moving the position of the cross hair CH, which is displayed on the display unit 17, away from the center of the target circle TC, and executes a process for an expression by video and audio, deeming that shooting was executed in the state in which there was no attack target MT (step S118). Thereafter, the CPU 11 returns to the process from step S101, in preparation for a touch operation on the next attack target.

In the meantime, as illustrated also in FIG. 3 to FIG. 5, while the shooting operation is executed by touch-operating the inside of the shooting button circle SC the position of the shooting button circle SC can be moved by slide-operating the outer frame of the shooting button circle SC.

Thus, shooting at the attack target MT can easily be executed by slide-operating the shooting button circle SC so that the attack target MT may fall within the target circle TC that is disposed inside the shooting button circle SC, and then executing a touch operation in the shooting button circle SC.

In the case where scores by shooting results on the game are different depending on regions constituting the attack target MT for instance, a body region, a head region and a leg region of the attack target MT, the outer frame of the shooting button circle SC is slide-operated such that a region with a higher score coincides with the cross hair, within an allowable range of time. Thereby, the user can aim at a higher score. Thus, the capabilities of the game can be enhanced, without varying the simple operability.

In the above-described embodiment, shootings executed within the shooting button circle SC, and the movement of the shooting button circle SC is executed by slide-operating the outer frame portion of the shooting button circle SC. However, for example, in the smartphone 10 including the display unit 17 with a size of about 4 inches in diagonal, when operating separately the outer frame portion and the inside of the shooting button circle SC, operation to the outer frame portion of the circle that the user intended, likely to be incorrectly detected as an operation of the inside of the shooting button circle SC. In this case, even if the user intended for operation to the outer frame portion of the shooting button circle SC, it is a possible that the shooting button circle SC is not moving, shooting is performed immediately.

Figure 6:
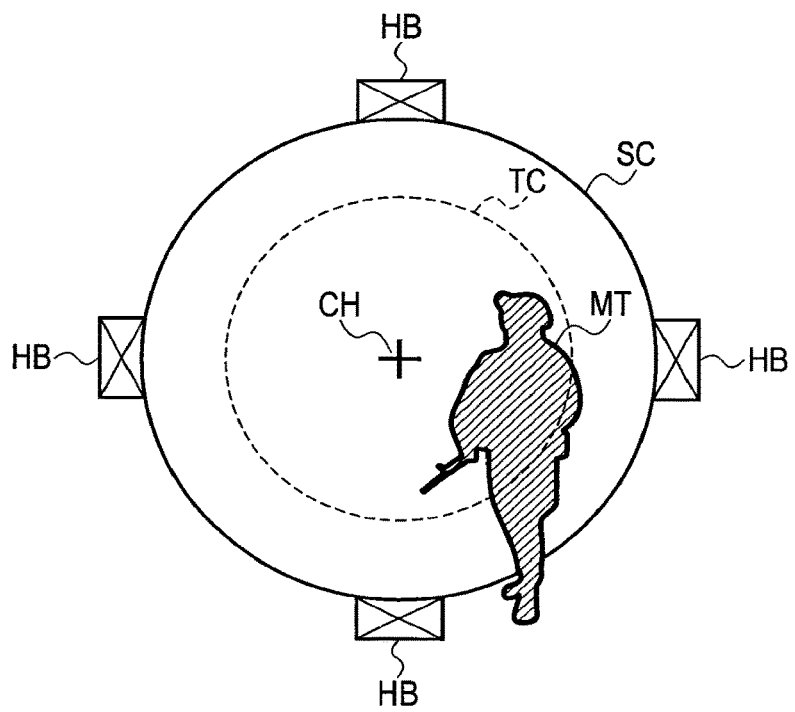
FIG. 6 is a view illustrating an image of a part of a shooting button circle which is displayed during the game in the embodiment.

Taking this into account, as illustrated in FIG. 6, a plurality of handle buttons HB for a slide operation may be disposed in advance on a periphery of the outer edge portion of the shooting button circle SC, and any one of the handle buttons HB may be slide-operated. Thereby, the movement of the shooting button circle SC may be executed.

Specifically, FIG. 6 illustrates an example in which handle buttons HB are disposed at four locations, i.e. at upper, lower, left and right parts, of the outer periphery of the shooting button circle SC. Even if an outer edge portion of the shooting button circle SC, other than these handle buttons HB, is operated, the movement of the shooting button circle SC is disabled, and an erroneous operation can be avoided.

The number of handle buttons HB, which are disposed, and the positions thereof are not limited to the example illustrated in FIG. 4, and other various modifications may be thinkable.

As has been described above in detail, according to the present embodiment, its possible to achieve both precise shooting and speedy game development by a simple and easy-to-understand operation, in a device including a touch-panel-type display unit and having a limited display area.

In addition, in the embodiment, the range of shooting is moved by slide-operating the outer edge of the shooting button circle SC which is broader than the target circle TC. Thus, the display range, which becomes a shooting target, is not hidden by the user's fingers, and an operation can be continued while the display range is always being visually recognized.

In the embodiment, shooting is executed by touch operation in the shooting button circle SC. Thus, the shooting is not executed by greatly moving the finger from a previous operation of moving the shooting button circle SC and then operating a button at another area, and a transition can be made to the operation of executing instant shooting. Therefore, the game with speedier development can be realized.

As illustrated in FIG. 6, in the above embodiment, the handle button HB for operating the slide movement of the shooting button circle SC may be provided. Thus, by properly disposing the handle buttons HB where necessary, the useless occurrence of an erroneous operation can surely be avoided.

In the embodiment, both the shooting button circle SC and the target circle TC have circular shapes. However, the invention is not limited to this example. For example, the shape of the shooting button circle SC and the target circle TC may be converted into a rectangular slit-shaped simulating a loophole, and rectangular or other shapes simulating a window. Specifically, the shape of the range capable of shooting and the shape of the range for instructing the execution of the shooting are not limited. Specifically, the shape of the range for instructing the execution of the shooting and shows a range capable of shootings not limited.

In the above embodiment, the game is executed in a stand-alone mode, based on a game program pre-installed in the smartphone 10. However, the invention is not limited to this example, and the game may be executed as an online game in a state in which the smartphone 10, which functions as a terminal device, is wirelessly connected to a game server apparatus over a network.

In this case, the smartphone 10 displays a game image and executes an input such as a touch operation on the game image. On the other hand, the game server apparatus executes a process of, in particular, determination of success/failure of an attack, and addition of scores at a time of a success.

The present invention is not limited to the above-described embodiments. In practice, various modifications may be made without departing from the sprit of the invention. In addition, the functions executed in the embodiments may be implemented by being properly combined as much as possible. The above-described embodiments include inventions in various stages, and various inventions can be derived from proper combinations of structural elements disclosed herein. For example, even if some structural elements in all the structural elements disclosed in the embodiments are omitted, if the advantageous effect can be obtained, the structure without such structural elements can be derived as an invention.

What is claimed is:

1. A non-transitory computer-readable medium including computer-program instructions, which when executed by an electronic device including a display configured to display a game image and a touch panel provided integral with the display, cause the electronic device to:

cause the display to display a frame indicative of a shooting effective range in accordance with a first touch operation on the touch panel;

identify a second touch operation at the touch panel as an instruction for an attack when the frame is displayed; and control to attack in accordance with a display position of the frame when the instruction for the attack is identified.

2. The non-transitory computer-readable medium of claim 1, wherein the computer-program instructions are configured to cause the electronic device to:

identify a slide operation on the frame on the touch panel; and cause the display to move first frame in the game image in accordance with the slide operation.

3. The non-transitory computer-readable medium of claim 2, wherein:
the second touch operation in the frame is identified as the instruction for the attack.

4. The non-transitory computer-readable medium of claim 2, wherein the computer-program instructions are configured to cause the electronic device to:
cause the display to add a movement operation graphic indicia to the frame and display the movement operation graphic indicia; and
identify a slide operation on the movement operation graphic indicia on the touch panel.

5. The non-transitory computer-readable medium of claim 1, wherein:
the frame is indicative of the shooting effective range in which shooting is effective even when the position of the second touch operation deviates from an attack target on the display.

6. The non-transitory computer-readable medium of claim 1, wherein the computer-program instructions are configured to cause the electronic device to:
control performing an attack on an attack target within the frame when the second touch operation is identified.

7. The non-transitory computer-readable medium of claim 1, wherein the computer-program instructions are configured to cause the electronic device to:
control performing an attack on an attack target among a plurality of attack targets within the frame when the second touch operation is identified.

8. A game system comprising:
a terminal device including a display configured to display a game image and a touch panel provided integral with the display; and
a game server apparatus configured to be connected to the terminal device via a network, wherein
the terminal device includes first circuitry configured to
control the display to display a frame indicative of a shooting effective range in accordance with a first touch operation on the touch panel; and
identify a second touch operation at the touch panel as an instruction for an attack when the frame is displayed by the display, and
the game server apparatus includes second circuitry configured to
control to attack in accordance with a display position of the frame when the instruction for the attack is identified.

9. One or more non-transitory computer-readable media including one or more programs executable by a game system including a first computer including a display configured to display a game image and a touch panel provided integral with the display, and a second computer which is connected to the first computer via a network,
the one or more programs controlling the first computer to
display a frame indicative of a shooting effective range on the display in accordance with a first touch operation on the touch panel; and
identify a second touch operation at the touch panel as an instruction for an attack when the frame is displayed, and
the one or more programs controlling the second computer to
control to attack in accordance with a display position of the frame when the instruction for the attack is identified.

10. A shooting game control method which is executed between a terminal device including a display configured to display a game image and a touch panel provided integral with the display, and a game server apparatus which is connected to the terminal device via a network, the method comprising:
displaying, by the display of the terminal device, a frame indicative of a shooting effective range in accordance with a first touch operation on the touch panel;
identifying, by the terminal device, a second touch operation at the touch panel as an instruction for an attack when the frame is displayed; and
controlling, by the game server apparatus, to attack in accordance with a display position of the frame when the instruction for the attack is identified.

11. An electronic device comprising:
a display configured to display a game image;
a touch panel provided integral with the display and configured to accept a touch operation on the touch panel; and
circuitry configured to
control a display of the electronic device to display a first frame indicative of a shooting effective range in accordance with a first touch operation on the touch panel;
identify a second touch operation at the touch panel as an instruction for an attack when the frame is displayed; and
control to attack in accordance with a display position of the frame when the instruction for the attack is identified.

12. The electronic device of claim 11, wherein the circuitry is configured to:
identify a slide operation on the frame on the touch panel; and
control the display to move the frame in the game image in accordance with the slide operation.

13. The electronic device of claim 12, wherein:
the second touch operation in the frame is identified as the instruction for the attack.

14. The electronic device of claim 12, wherein the circuitry is configured to:
control the display to add a movement operation graphic indicia to the frame and display the movement operation graphic indicia; and
identify a slide operation on the movement operation graphic indicia on the touch panel.

15. The electronic device of claim 11, wherein:
the frame is indicative of the shooting effective range in which shooting is effective even when the position of the second touch operation deviates from the attack target on the display.

16. The electronic device of claim 11, wherein the circuitry configured to:
control to attack on an attack target within the frame when the second touch operation is identified.

17. The electronic device of claim 11, wherein the circuitry configured to:
control an attack on the attack target among a plurality of attack targets within the frame when the second touch operation is identified.

* * * * *